(12) United States Patent
Zander

(10) Patent No.: US 9,457,418 B2
(45) Date of Patent: Oct. 4, 2016

(54) GAS-COOLED WELDING GUN FOR AN ARC WELDING DEVICE

(75) Inventor: Peter Zander, Norderstedt (DE)

(73) Assignees: DINSE G.M.B.H., Hamburg (DE); Christopher Mewes, Kaltenkirchen (DE)

(*) Notice: Subject to any disclaimer, the term of this patent is extended or adjusted under 35 U.S.C. 154(b) by 386 days.

(21) Appl. No.: 13/984,306

(22) PCT Filed: Feb. 9, 2012

(86) PCT No.: PCT/EP2012/052162
§ 371 (c)(1),
(2), (4) Date: Aug. 8, 2013

(87) PCT Pub. No.: WO2012/107509
PCT Pub. Date: Aug. 16, 2012

(65) Prior Publication Data
US 2013/0313241 A1 Nov. 28, 2013

(30) Foreign Application Priority Data

Feb. 9, 2011 (DE) .................... 20 2011 000 295 U

(51) Int. Cl.
| | |
|---|---|
| B23K 9/28 | (2006.01) |
| B23K 9/16 | (2006.01) |
| B23K 9/173 | (2006.01) |
| B23K 9/29 | (2006.01) |

(52) U.S. Cl.
CPC ............... B23K 9/285 (2013.01); B23K 9/164 (2013.01); B23K 9/173 (2013.01); B23K 9/295 (2013.01)

(58) Field of Classification Search
CPC ...... B23K 9/164; B23K 9/173; B23K 9/285; B23K 9/295

USPC ............ 219/137.31, 137.42, 137.43, 137.44, 219/137.51, 137.62, 137.63
See application file for complete search history.

(56) References Cited

U.S. PATENT DOCUMENTS

| | | | | |
|---|---|---|---|---|
| 3,089,022 A | * | 5/1963 | Kinney | ................. B23K 9/122 219/137.44 |
| 3,102,188 A | * | 8/1963 | Wills | ..................... B23K 9/173 219/74 |

(Continued)

FOREIGN PATENT DOCUMENTS

| | | |
|---|---|---|
| EP | 0074106 | 3/1983 |
| GB | 684011 | 12/1952 |

(Continued)

*Primary Examiner* — Dana Ross
*Assistant Examiner* — James Sims, III
(74) *Attorney, Agent, or Firm* — Sand & Sebolt

(57) ABSTRACT

A gas-cooled welding gun for an arc welding device, comprising an electrically conductive current contact tube disposed concentrically within an electrically conductive outer tube and separated therefrom by an intermediate space. The current contact tube includes a wire guiding channel for a welding wire. A plurality of spacers is disposed at intervals in the intermediate space between the current contact tube and outer tube, electrically insulating these components from each other. A shielding gas is provided in the intermediate space to cool the system and openings in the spacers allow the gas to flow therethrough. Structures are provided on the current contact tube which increase the overall surface area thereof. Regions of the surface of the current contact tube not covered by spacers are exposed toward the intermediate space and therefore to the shielding gas.

6 Claims, 2 Drawing Sheets

(56) References Cited

U.S. PATENT DOCUMENTS

| | | | |
|---|---|---|---|
| 3,253,116 A | | 5/1966 | Kensrue |
| 3,436,522 A | | 4/1969 | Carkhuff et al. |
| 3,659,076 A | | 4/1972 | Ogden, Sr. |
| 4,464,560 A | * | 8/1984 | Church ............... B23K 9/291 219/137.42 |
| 4,529,863 A | * | 7/1985 | Lebel ................. B23K 9/173 219/137.2 |
| 5,994,659 A | * | 11/1999 | Offer ................. B23K 9/1093 219/136 |
| 7,342,200 B2 | * | 3/2008 | Eberle ............... B23K 9/295 219/137.31 |
| 2002/0134760 A1 | * | 9/2002 | Rehrig ............... B23K 9/167 219/75 |
| 2006/0226132 A1 | | 10/2006 | Giese |
| 2009/0032514 A1 | * | 2/2009 | Christopher ......... B23K 9/1336 219/137.31 |
| 2010/0270269 A1 | | 10/2010 | Khakhalev et al. |

FOREIGN PATENT DOCUMENTS

| | | |
|---|---|---|
| JP | 2010284666 | 12/2010 |
| JP | 2010284666 A | 12/2010 |

* cited by examiner

GAS-COOLED WELDING GUN FOR AN ARC WELDING DEVICE

TECHNICAL FIELD

The present invention relates to a gas-cooled welding gun for an arc welding device with the features in claim 1.

PRIOR ART

Welding guns, also referred to as welding torches, are those components of an arc welding device in which, surrounded by a shielding gas shield, the arc is ignited at the weld location and the welding wire as well as the material that is to be welded are melted at the seam and intermixed to form an integral bond. The thermal energy from melting the material is achieved with high electrical currents in the arc welding technique. The currents needed for this are supplied to the welding point via a current contact tube in the interior of the welding gun, which typically has a wire guiding channel in its interior, through which the welding wire is fed to the welding point. A casing tube is guided around the current contact tube in the region between these components, the shielding gas is transported to the welding point and a cooling system is set up to dissipate the thermal energy generated in this space during welding. The shielding gas seals off the welding point against ambient air and in particular prevents the penetration of oxygen, wherein the shielding gas may function as a pure inert gas (in the case of MIG welding), but may also exert an influence on the welding process (in the case of MAG welding).

In principle, two different approaches with regard to the cooling system can be distinguished. Thus a number of welding guns for arc welding devices on the market are known that are liquid-cooled, as a rule having a water cooling system. Another concept provides a pure gas cooling system, wherein the shielding gas is typically used as a cooling gas. In this case the shielding gas flowing through the intermediate space between the current contact tube and the outer tube not only serves to insulate the welding point from the ambient air, it also serves to dissipate thermal energy from the welding gun and prevents overheating of the welding gun and any resulting damage or shortening of lifespan.

In the case of this kind of gas-cooled welding gun, which is the focus of the further development of the invention, care must naturally be given to ensure that the current contact tube does not come into contact with the outer tube, which consists of an electrically conductive material, or that it does not come close enough to that outer tube that it causes a spark discharge. This is because otherwise, if the welding current being conducted in the current contact tube were to reach the outer tube, it would cause a short circuit and possibly endanger operating personnel. A particular problem here is that, due to the temperature increases in the welding gun as a result of thermal expansion, relative movements may occur between the current contact tube and the outer tube, which may result in the aforementioned problems and hazards if there is insufficient insulation between these components.

In the case of the welding guns using this cooling technique that are currently known and are available on the market, the current contact tube that lies in the outer tube is typically entirely coated with insulation, for example with a few tenths to a few millimeters thickness of plastic shrink film, which provides reliable electrical insulation.

This design has proven to be reliable in terms of the electrical insulation. A problem, however, is that the electrical insulation applied to the current contact tube also necessitates a reduction in the thermal conductivity so that there is less heat transfer from the current contact tube into the shielding gas flowing above the electrical insulation as compared to heat transfer when the shielding gas is in direct contact with the electrically conductive material of the current contact tube. This leads to difficulties in terms of a reliable dissipation of heat and a generally reduced lifespan in corresponding welding guns. In order to counteract this, increased shielding gas flow rates are frequently set, which then lead to a high consumption of this material that is not needed for the welding process itself, and in the worst case, that conflict with the parameters that must be set for optimum welding.

REPRESENTATION OF THE INVENTION

This is where the invention becomes significant, the object of which is to further develop a gas-cooled welding gun to the extent that an improved cooling effect can be achieved while at the same time still reliably insulating the current contact tube vis-à-vis the outer tube.

This object is achieved by the invention with a gas-cooled welding gun according to the features of claim 1. Advantageous further developments of such a welding gun include that the outer tube also lies with the surface of the electrically conductive material thereof exposed in the intermediate space in those regions in which no spacers are disposed. Furthermore, the structures that increase the surface area of the current contact tube are cooling ribs. The spacers each have a first annular section resting on an outside of the current contact tube, and a second annular section resting on the inside of the outer tube, and the two annular sections have spoke-like connecting crosspieces extending between the first and second annular sections. The spacers consist entirely of an electrically insulating material, especially of an electrically insulating plastic or a ceramic of this kind. The current contact tube and/or the outer tube are formed out of metal.

The development according to the invention is characterized in that a complete insulation of the current contact tube through the application of a corresponding electrically insulating layer is foregone, and spacers that are respectively designed to be sufficiently rigid are disposed only in partial regions of the intermediate space between the current contact tube and the outer tube in order to ensure that a distance is maintained. These spacers have corresponding openings in order to allow the shielding gas to pass through, so as not to interrupt shielding gas guide channel that is formed between the current contact tube and the outer tube, but instead, guarantee a reliable passage of the shielding gas and the delivery of that shielding gas to the exit point in the welding area. Through these measures, it is ensured that the shielding gas used to cool the welding gun comes into direct contact with the electrically conductive material of the current contact tube and is thereby able to effect significantly improved heat absorption as compared to the situation having an intermediate insulation layer. The second measure according to and essential to the invention is that the current contact tube has structures that increase the surface area in those regions, in which the spacers are not disposed, and in which the current contact tube lies with the surface of the electrically conductive material exposed in the intermediate space. This may be cooling ribs for example, but may also be other types of structure that lead to an increase in the surface area. This increase in surface area, which was not used in the design of a completely insulated current contact tube known from prior art, and which was not possible since the application of an insulating shrink film over structures of this kind cannot be achieved without a substantial risk of tears in the film, and therefore of an interruption of the insulation, leads to a further improved heat transfer effect, so that the heat from the current contact tube can pass more efficiently into the shielding gas and removed therefrom.

A substantially improved heat dissipation from the welding gun can also be achieved through the measures according to the invention so that the welding gun can be kept at a lower temperature with the same gas flow rate setting, or a lower gas flow is needed when setting a predetermined maximum temperature. This helps to increase the lifespan of such a welding gun and can contribute to a reduction in the consumption of the shielding gas medium.

The outer tube also advantageously lies in the regions in which no spacers are disposed with the surface of the electrically conductive material exposed in the intermediate space. This leads to a correspondingly improved heat transfer effect at this interface as well and further supports the improved cooling effect.

The spacers have proven to be particularly stable and reliable if, as provided in an embodiment of the invention, they have a first annular section resting externally on the current contact tube enclosing it, a second annular section resting on the inside of the outer tube (which, in particular, is formed such that it is continuous) and between the annular sections spoke-like connecting crosspieces joining the annular sections and leaving intermediate openings therebetween. Such a design of the spacers, which can also extend over a certain axial length, has been found to be particularly stable even under loads as can occur due to different thermal expansions and therefore deformations of the outer tube relative to the current contact tube. Such spacers must only be disposed in relatively small numbers in the space between current contact tube and outer tube in order to reliably maintain the required distance, so that large regions of the aforementioned components can be disposed with their electrically conductive surfaces directly facing and exposed to the intermediate space, so that an improved heat dissipation effect occurs especially well. In addition, even large areas of the current contact tube can be provided with corresponding structures that increase the surface area, which contributes to good heat dissipation.

The spacers preferably consist entirely of an electrically insulating material, which may in particular be an electrically insulating plastic, but preferably be such a ceramic. Ceramics, in turn, has the advantage that it is very durable and can be subjected to very high static, as well as dynamic, loads in the required measure, at any rate, without having to worry that it would be destroyed thereby. In this case, the required distance can reliably be maintained between the current contact tube and the outer tube with such components.

Typically, both the current contact tube and the outer tube consist of metallic materials; the current contact tube generally being comprised of copper and the outer tube frequently being comprised of stainless steel.

The welding gun according to the invention can be designed both for use on an automatic welding machine, and for manual use.

BRIEF DESCRIPTION OF THE DRAWINGS

Further advantages and features of the invention can be derived from the following description of embodiments with reference to the accompanying figures. Shown are:

FIG. 4 a schematic top view of a first embodiment of a possible spacer, and

METHODS(S) OF IMPLEMENTING THE INVENTION

The figures show schematic representations of embodiments of the invention. They do not reproduce all design details, nor are they necessarily to scale, but rather they are intended to be understood as schematic diagrams that illustrate essential features of the invention.

Figure 1:
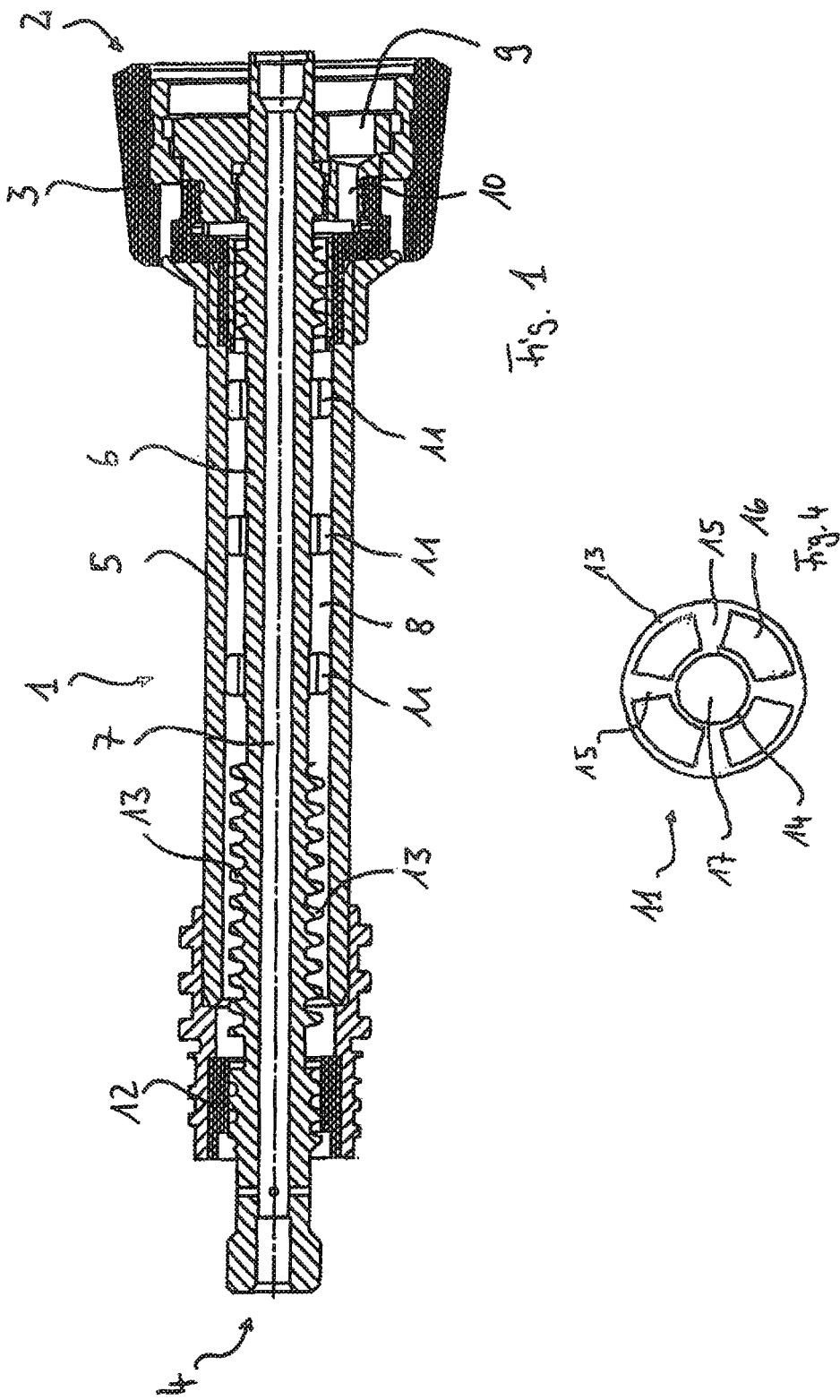
FIG. 1 a sectional side view of a welding gun according to the invention having a straight pathway.

FIG. 1 shows a sectional side view of a welding gun representing essential components, and in general is referred to as 1. The welding gun 1 has a coupling nut 3 on a rearward connection end 2 for attachment to a corresponding connector on a media supply system, for example a so-called hose assembly. The welding end 4, which represents the front end of the welding gun 1, is on the side opposite the connection end 2.

The welding gun in FIG. 1 extends in a straight line between the connection end 3 and the welding end 4, and is externally bordered by an outer tube 5 in a corresponding middle section. A current contact tube 6 runs essentially through the center of and coaxially to the outer tube 5. In its interior, this current contact tube 6 has a wire guiding channel 7, through which the welding wire is guided during operation and brought to the welding end 4. The current contact tube 6 is formed out of metal, in particular of copper, and in addition to feeding the welding wire through the wire guiding channel 7 in its interior, also serves to bring the welding current to the welding end 4. The arc is ignited on the welding end 4 with the aid of this welding current in order to melt the welding wire as well as the material to be welded at the welding point.

An intermediate space 8 is formed between the outer tube 5 and the current contact tube 6, which is also a conduit for shielding gas that is to be supplied to the welding end 4. The shielding gas is transferred in the connection end 2 from a corresponding media supply system into a shielding gas connection 9 and there, finds its way into the intermediate space 8 via the bore 10.

A total of three spacers 11 are disposed in the intermediate space 8 at approximately half the extension of the outer tube and at two positions equidistant to the connection end 2. These are made out of an electrically insulating material, in particular of ceramic, and each consist of an inner ring, which is enclosed around the current contact tube 6 situated in the necking of this material in order to prevent axial slippage along the longitudinal direction of the current contact tube 6, an outer ring, which likewise has a continuous design and is supported on the inner wall of the outer tube 5, as well as connecting spoke-like connecting crosspieces that extend radially from both rings. Openings are formed between these crosspieces so that the conduit for shielding gas formed in the intermediate space 8 extends through the spacers 11. An additional spacer 12 is formed in the vicinity of the welding end 4 having a similar design.

The metal surface of the current contact tube 6 lies exposed in the intermediate space 8 in the intermediate areas in which no spacers are disposed. The surface of the inner wall of the outer tube 5, which is made of steel, likewise lies exposed in these areas and without an intermediate layer of any insulating layers, exposed to the intermediate space 8.

The protective contact tube 6, which is contoured with cooling ribs 13 to increase the surface area, is formed in an elongated [section] between the foremost spacer 11, which is to say the spacer 11 closest to the welding end 4, and the spacer 12, the current contact tube 6 is contoured with cooling ribs 13 to increase the surface area. These cooling ribs 13 extend in a spiral around the current contact tube 6. Here, other embodiments are conceivable, for example cooling ribs that are not designed as a continuous spiral, but rather as successive cooling ribs that are disposed parallel to one another.

In the section in which they are disposed, the cooling ribs 13 provide an increase in the surface area of the current contact tube 6 and thus a more intensive and more extended contact of the shielding gas flowing past the cooling ribs 13 with the current contact tube 6. This measure, together with the fact that the current contact tube 6 is exposed to the intermediate space 8 without an insulating layer in this area, and therefore comes into direct contact with the shielding gas flowing through this intermediate space 8, improves the cooling effect of the shielding gas to the highest degree.

It should be noted here that the welding gun 1 is shown without the components of a gas distributor (which sits at the welding end 4 on the current contact tube 6 and distributes the shielding gas emerging there over the entire perimeter) needed to complete that welding gun, as well as the components of a gas nozzle, which is screwed into this section and surrounds the current contact tube 6 at the welding end 4, and which focuses and feeds the shielding gas while simultaneously sealing off the welding point to a certain degree.

Figure 2:
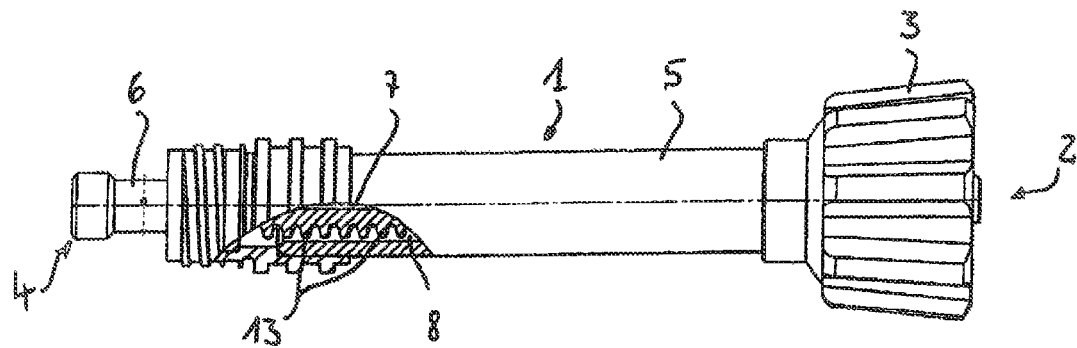
FIG. 2 a view comparable to that in FIG. 1 of the same welding gun, however not a complete cutaway, but only a partial cutaway.

FIG. 2 shows a welding gun 1 as in FIG. 1 in a sectional side view once again with only a partial cut-away of the same side view.

Figure 3:
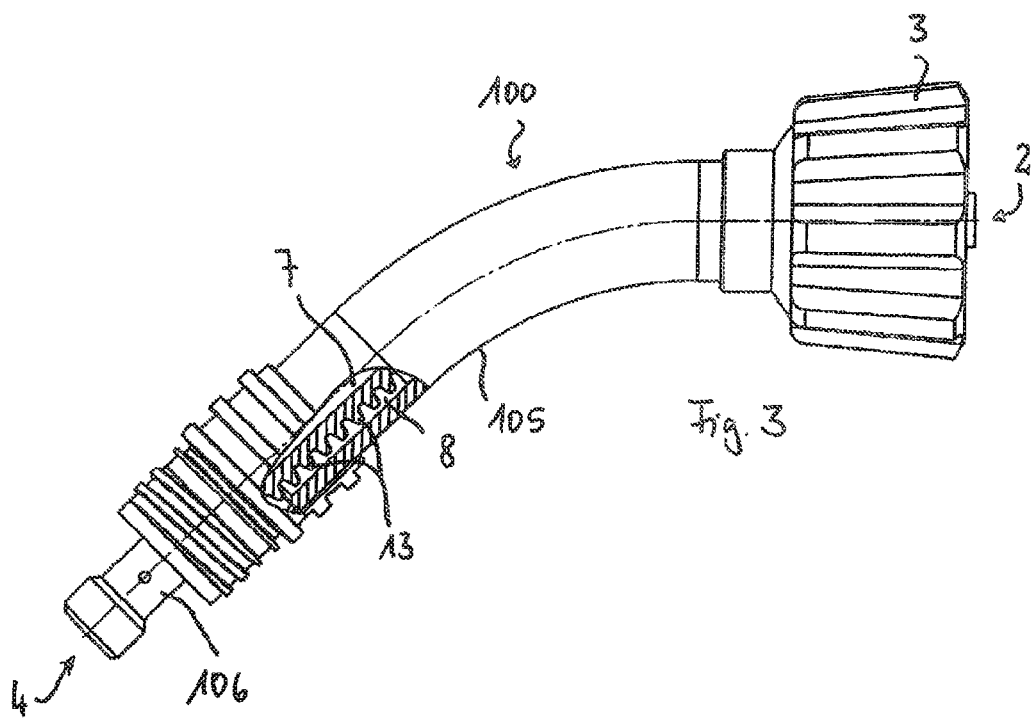
FIG. 3 a view like FIG. 2 of an alternative welding gun according to the invention having a curved tube design.

FIG. 3 shows an alternative embodiment of a welding gun according to the invention, which here is designated as 100. This welding gun has essentially the same structure, however it is curved and does not have an elongated pathway as in the embodiment shown above. The outer tube 105 and the current contact tube 106 are both curved accordingly. Otherwise the corresponding spacers 11 and 12 (not shown) are also situated here at their respective positions, the current contact tube 106 and outer tube 105 are both designed without insulation facing the intermediate space 8 and the current contact tube 106 has cooling ribs 13 to improve the cooling effect.

FIG. 4 shows a schematic top view of a spacer 11 according to a first embodiment of the same. It can be seen there that this spacer comprises an inner ring 14, which rests on the current contact tube 6, and an outer ring 13 for contact with the inner side of the outer tube 5. There are spoke-like crosspieces 15 that extend between the inner ring 14 and the outer ring 13 which leave intermediate openings 16 between them. During operation, the gas flows through these intermediate openings 16 along the conduit 8.

Figure 5:
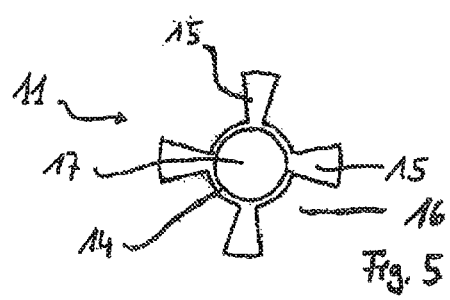
FIG. 5 a schematic top view of a second embodiment of a possible spacer.

FIG. 5 shows a possible modification of the spacer 11. The spacer 11 shown there has no outer ring 13. When in an installed state, it is instead supported with the ends of the spoke-like crosspieces 15 directly on the inside of the outer tube 5. Intermediate openings 16 are also formed here for the passage of gas between the crosspieces 15.

The foregoing description of the embodiments makes it once again clear the manner in which the invention provides a substantial improvement in the cooling characteristics of a gas-cooled welding gun, 1 or 100 respectively.

LIST OF REFERENCE CHARACTERS 1 welding gun
2 connection end
3 coupling nut
4 welding end
5 outer tube
6 current contact tube
7 wire guiding channel
8 intermediate space/conduit
9 shielding gas connection
10 bore
11 spacer
12 spacer
13 outer ring
14 inner ring
15 spoke-like connecting crosspiece
16 intermediate opening
100 welding gun
105 outer tube
106 current contact tube

The invention claimed is:

1. A gas-cooled welding gun for an arc welding device comprising:
a current contact tube formed of an electrically conductive material, inside of which a wire guiding channel for a welding wire is formed;
an outer tube that surrounds the current contact tube; an intermediate space formed between the current contact tube and an inner wall of the outer tube; wherein the inner wall of the outer tube is formed of an electrically conductive material; and wherein the intermediate space is formed as a continuous conduit for a shielding gas; and
spacers disposed between the current contact tube and the inner wall of the outer tube electrically insulating the current contact tube and the outer tube from one another, wherein the spacers have intermediate openings defined therein in order to allow the shielding gas to pass through the spacers each have a first annular section resting on an outside of and enclosing the current contact tube, and a second annular section resting on an inside of the outer tube, and spoke-like connecting crosspieces connect the first and second annular sections together and the intermediate openings are defined by the first and second annular sections and the spoke-like connecting crosspieces, and wherein the spacers are only disposed in partial regions of the intermediate space and in the remaining regions, the current contact tube with the surface of the electrically conductive material is exposed in the intermediate space, and that, in at least part of the remaining regions in which the current contact tube lies with the surface of the electrically conducting material exposed towards the intermediate space, structures that increase the surface area are provided on the current contact tube; and wherein the shielding gas cools the welding gun.

2. The welding gun according to claim 1, wherein the spacers are entirely comprised of an electrically insulating material.

3. The welding gun according to claim 2, wherein the electrically insulating material is an electrically insulating plastic material or an electrically insulating ceramic material.

4. The welding gun according to claim 1, wherein the outer tube also lies with a surface of the electrically conductive material of the inner wall thereof exposed in the intermediate space in those regions in which no spacers are disposed.

5. The welding gun according to claim 1, wherein the structures that increase the surface area are cooling ribs.

6. The welding gun according to claim 1, wherein the current contact tube and/or the outer tube are formed out of metal.

\* \* \* \* \*